(12) United States Patent
Miya et al.

(10) Patent No.: US 10,019,914 B2
(45) Date of Patent: Jul. 10, 2018

(54) IN-MOLD LABELS AND A LABELED CONTAINER

(71) Applicants: Takashi Miya, Matsudo (JP); Masafumi Fujita, Matsudo (JP)

(72) Inventors: Takashi Miya, Matsudo (JP); Masafumi Fujita, Matsudo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 495 days.

(21) Appl. No.: 14/397,402

(22) PCT Filed: Mar. 11, 2013

(86) PCT No.: PCT/JP2013/056589
§ 371 (c)(1),
(2) Date: Oct. 27, 2014

(87) PCT Pub. No.: WO2013/161403
PCT Pub. Date: Oct. 31, 2013

(65) Prior Publication Data
US 2015/0083630 A1    Mar. 26, 2015

(30) Foreign Application Priority Data

Apr. 27, 2012 (JP) ................................. 2012-102276
Oct. 31, 2012 (JP) ................................. 2012-239857

(51) Int. Cl.
*G09F 3/02* (2006.01)
*G09F 3/04* (2006.01)
(Continued)

(52) U.S. Cl.
CPC ........... *G09F 3/02* (2013.01); *B65D 23/0864* (2013.01); *B65D 25/205* (2013.01); *G09F 3/04* (2013.01);
(Continued)

(58) Field of Classification Search
CPC .......... G09F 3/10; G09F 3/02; B65D 23/0864
See application file for complete search history.

(56) References Cited

U.S. PATENT DOCUMENTS 5,254,302 A * 10/1993 Yamanaka ............... B31D 1/02
156/209
5,811,163 A * 9/1998 Ohno ..................... B29C 49/24
215/230

(Continued)

FOREIGN PATENT DOCUMENTS

JP            H0262468 U      5/1990
JP            2004136486 A    5/2004
(Continued)

OTHER PUBLICATIONS

Jun. 11, 2013 International Search Report issued in International Patent Application No. PCT/JP2013/056589.
Oct. 28, 2014 International Preliminary Report on Patentability issued in International Application No. PCT/JP2013/056589.

*Primary Examiner* — Gary C Hoge
(74) *Attorney, Agent, or Firm* — Oliff PLC (57) ABSTRACT

A technical problem of this invention is to create in-mold labels that can be adhered to wide areas, including 3D curved areas, of the peripheral wall of a synthetic resin container in a high-grade state without air entrapment and/or wrinkling. A principal means of this invention to solve the technical problem described above is in-mold labels used as an inserted material and adhered to the outer peripheral wall of a container main-body concurrently when the main body is being molded, said labels including an adhesive layer to be adhered to the outer peripheral wall of the container main-body, wherein this adhesive layer has depressed portions on a back surface thereof, the depressed portions being formed by embossing and being disposed in a regular pattern.

7 Claims, 11 Drawing Sheets

(51) Int. Cl.
  *B65D 23/08* (2006.01)
  *B65D 25/20* (2006.01)
  *G09F 3/10* (2006.01)
  *B29L 31/00* (2006.01)
  *B29C 49/04* (2006.01)
  *B29C 49/24* (2006.01)

(52) U.S. Cl.
  CPC ............... *G09F 3/10* (2013.01); *B29C 49/04* (2013.01); *B29C 2049/241* (2013.01); *B29C 2049/2412* (2013.01); *B29C 2049/2449* (2013.01); *B29C 2049/2472* (2013.01); *B29L 2031/7158* (2013.01); *G09F 2003/0202* (2013.01); *G09F 2003/023* (2013.01); *G09F 2003/0208* (2013.01); *G09F 2003/0257* (2013.01); *G09F 2003/0273* (2013.01); *Y10T 428/24736* (2015.01)

(56) References Cited

U.S. PATENT DOCUMENTS

| | | | |
|---|---|---|---|
| 6,551,671 B1* | 4/2003 | Nishizawa | G09F 3/04 428/312.2 |
| 6,764,760 B2* | 7/2004 | Nishizawa | B32B 27/18 264/173.16 |
| 8,048,363 B2* | 11/2011 | Schlaupitz | B29C 45/14778 156/245 |
| 2002/0150706 A1* | 10/2002 | Tachi | B65D 1/0207 428/34.5 |
| 2009/0041992 A1* | 2/2009 | Umeda | C08L 23/0853 428/200 |

FOREIGN PATENT DOCUMENTS

| | | |
|---|---|---|
| JP | 2006276646 A | 10/2006 |
| JP | 2012247583 A | 12/2012 |
| WO | 2011152171 A1 | 12/2011 |

* cited by examiner

Table 1

| Label | Laminar structure of label | Thickness (mm) | Depth (mm) | Atr (%) | Nt (number /cm²) | Vt (cm³/cm²) | Value of G longitudinal direction | Value of G lateral direction |
|---|---|---|---|---|---|---|---|---|
| Example 1 (L1) | CPP(70)/printed layer/AC layer/extrusion LDPE(10) | 0.085 | 0.060 | 46 | 324 | 0.00200 | 0.142 | 0.130 |
| Example 2 (L2) | extrusion LDPE(10)/AC layer/printed layer/CPP(70) | 0.085 | 0.075 | 46 | 324 | 0.00250 | 0.150 | 0.145 |
| Comparative example 1 (Lc1) | CPP(70)/printed layer/AC layer/extrusion LDPE(20) | 0.095 | 0.015 | 46 | 324 | 0.00038 | 0.198 | 0.182 |
| Comparative example 2 (Lc2) | varnish/printed layer/synthetic paper(80)/HS layer(8) | 0.090 | 0.010 | 30 | 400 | 0.00020 | 0.536 | 0.283 |
| Comparative example 3 (Lc3) | CPP(60)/printed layer/DL layer/Co-PP(30) | 0.095 | 0.015 | 25 | 400 | 0.00030 | 0.378 | 0.339 |
| Comparative example 4 (Lc4) | CPP(80)/printed layer/AC layer/extrusion LDPE(20) | 0.105 | 0.060 | 46 | 324 | 0.00200 | 0.297 | 0.268 |

Note
1) AC layer: anchor coat layer
2) HS layer: heat seal layer
3) DL layer: dry laminate layer
4) Co-PP: polypropylene copolymer
5) Number in parentheses in column of "Laminar structure of label": thickness of the layer with micrometric unit
6) Depth: average depth of the depressed portions
7) Atr: ratio of "total of the area of the depressed portion" to "area of the label" (%)
8) Nt: number of the depressed portion per unit area (number/cm²)
9) Vt: total of spatial volumes of the depressed portions per unit area (cm³/cm²)

Fig. 12

Table 2

| Labeled container | Label | Material of container main-body | Development of wrinkle | Entrapment of air | Depth of depressed portions after the in-mold labeling (mm) |
|---|---|---|---|---|---|
| Example 1 (B1) | L1 | HDPE | No | No | 0.030 |
| Example 2 (B2) | L2 | PP | No | No | 0.040 |
| Comparative example 1 (Bc1) | Lc1 | HDPE | Yes | Yes | less than 0.01 |
| Comparative example 2 (Bc2) | Lc2 | PP | Yes | Yes | less than 0.01 |
| Comparative example 3 (Bc3) | Lc3 | HDPE | Yes | Yes | less than 0.01 |
| Comparative example 4 (Bc4) | Lc4 | HDPE | Yes | No | 0.030 |

IN-MOLD LABELS AND A LABELED CONTAINER

TECHNICAL FIELD

This invention relates to in-mold labels used as an inserted material and adhered to an outer peripheral wall of a container main-body concurrently when the container main-body is being molded, and to a labeled container to which these labels have been adhered.

BACKGROUND ART

As a means of decorations or of showing the name of, and/or instructions on, a product on one side or both sides of a body of a synthetic resin blow-molded product, much use is made of those means of adhering the labels on which decorative patterns, product name, instructions, and the like, are printed. As a method of attaching labels there is an in-mold labeling process, which comprises using what is called the in-mold labels (hereinafter at times referred to simply as the labels) as an insert material, setting previously the labels inside a mold, and adhering the labels to outer peripheral wall surfaces of a container main-body just when the main body is molded.

This in-mold labeling process has the following distinguished features: 1) Labels are adhered to the container main-body concurrently when the main body is being molded, thus requiring no adhering work in another exclusive process step; 2) since there is no different level in height between the container main-body and the labels, there is no risk of damaged external appearance and/or a sense of discomfort to the touch; and 3) strong and steady adhesion to the main body is available, regardless of thin wall found in today's blow molded containers. Patent document D1, for example, describes an invention on in-mold labels, a labeled and blow molded product, and a process for manufacturing such a product.

Figure 13:
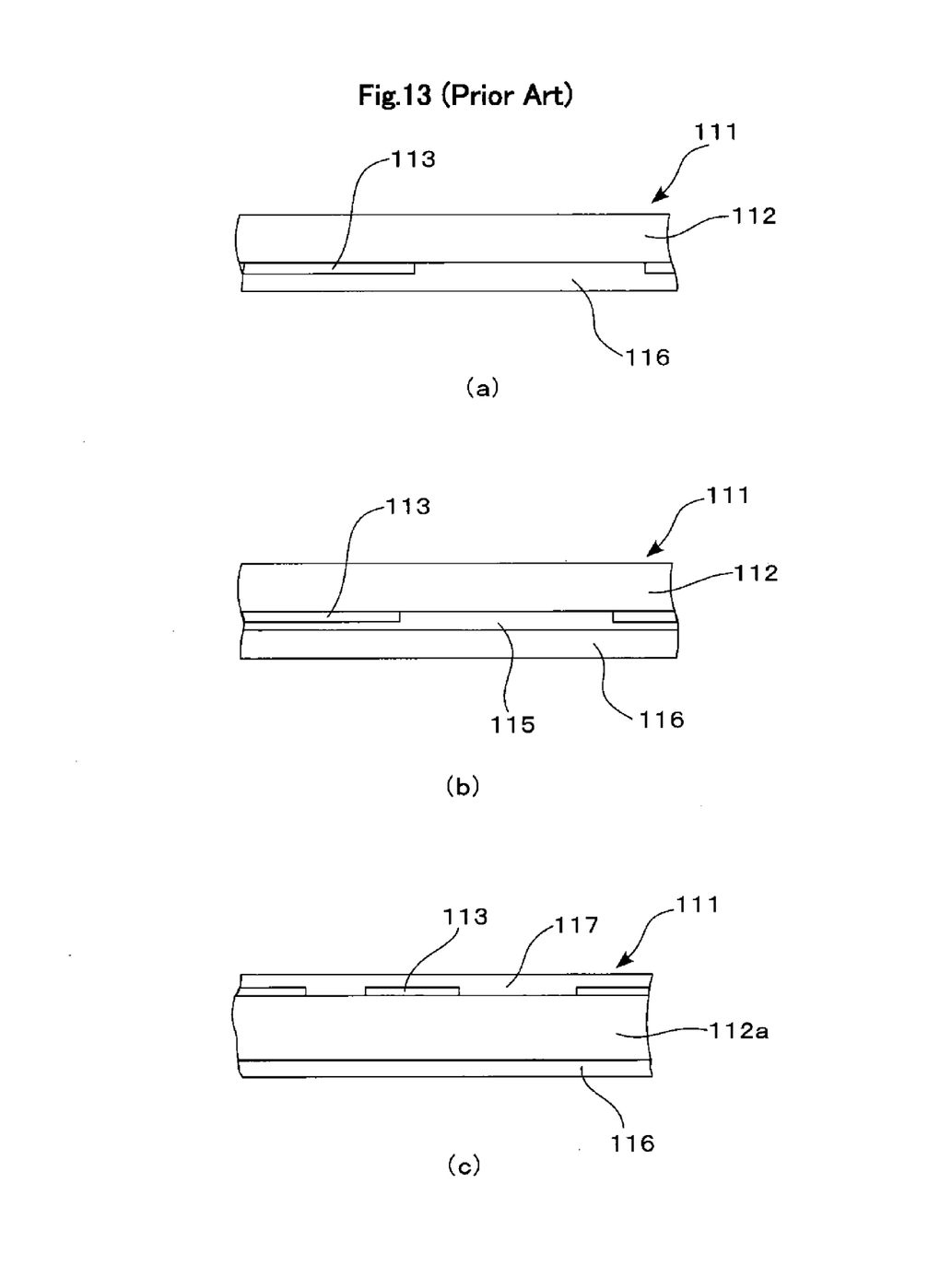

FIGS. 13(a), 13(b) and 13(c) are vertical sections showing three examples of basic laminar structures for in-mold labels that have been in general use conventionally. The label 111 of FIG. 13(a) comprises a clear substrate layer 112 made of an unstretched cast polypropylene film (hereinafter referred to as the CPP film), a gravure printed layer 113 formed on the back of the substrate layer 112, and an adhesive layer 116 made of a polyethylene series resin laminated by an extrusion laminate processing method. The label 111 of FIG. 13(b) comprises a clear substrate layer 112 of a CPP film, a gravure printed layer 113 formed on the back of the substrate layer 112, and an adhesive layer 116 made of a copolymerized PP resin film laminated through an intermediary of a dry laminate layer 115.

The label 111 of FIG. 13(c) comprises a substrate layer 112a of a synthetic paper, a heat-sealed adhesive layer 116 laminated on the back of the substrate layer 112, a flexography printed layer 113 formed on the surface of the substrate layer 112, and a clear protective layer 117 that covers the printed layer 113.

PRIOR ART REFERENCE

A Patent Document

Patent Document D1
Publication number: JP2004-136486 A

SUMMARY OF THE INVENTION

Problems to be Solved by the Invention

The areas, to which those labels described above are adhered, were conventionally limited to two-dimensional (2D) curved surfaces. It was difficult for the labels to be adhered to wide areas, including three-dimensional (3D) curved areas, such as, e.g., a spherical arc shell shape.

That is, the 3D curved surface is a surface which cannot be formed merely by curving the label having a planar shape. If a planar label is forcibly adhered to a 3D curved surface by the in-mold labelling process, then the label tends to develop blisters of entrapped air and/or wrinkles, thus giving damage to the outer appearance of the container.

If it becomes possible to adhere in-mold labels to the 3D curved surfaces, then the labels would have such advantages as a wider display area, more contents to be displayed, and/or larger font sizes to be used.

Thus, a technical problem of this invention is to create in-mold labels that can be adhered to wide areas, including 3D curved areas, of the peripheral wall of a synthetic resin container in a high-grade state without entrapped air blisters and/or wrinkles.

Means of Solving the Technical Problem

A main feature of the labels of this invention associated with the means of solving the technical problem described above is the in-mold labels used as an inserted material and adhered to an outer peripheral wall of a container main-body concurrently when the main body is being molded, wherein the labels comprise an adhesive layer to be adhered to this outer peripheral wall, wherein the adhesive layer has depressed portions that are formed by embossing and are disposed in a regular pattern on a back surface of this layer, and wherein the depressed portions have:

an average depth in a range of 0.02 to 0.1 mm, an average number in a range of 25 to 2,500 per square cm of a unit surface area of a label; and a total of spatial volumes in a range of 0.001 to 0.005 cubic cm per square cm of the unit surface area of the label.

In these definitions, the depths of the depressed portions are measured by enlarging and observing the label cross-sections by means of a microscope.

The number of depressed portions per square cm of a unit surface area of the label is counted by enlarging the adhesive side of the label on a microscope and counting the number.

The total of spatial volumes of the depressed portions per square cm of the unit surface area of the label is obtained by calculating a spatial volume of a depressed portion from the shape and depth of a depressed portion and multiplying the spatial volume by the number of the depressed portions per square cm of the unit surface area of the label.

The inventors studied the adherence property of the in-mold labels adhered to 3D curved surfaces of the outer peripheral wall of the synthetic resin container main-body. They have been led to create the above described feature when they found that high-grade adhesion is available in a state with no entrapment of air and no development of wrinkles over the 3D curved surfaces. This can be achieved by embossing and laying out the depressed portions in a regular pattern on the back side of the adhesive layer to be adhered to the peripheral wall of the container main-body, and by setting the depth, the number, and the total of spatial volumes of these depressed portions that should fall within appropriate ranges.

According to the above-described feature of the in-mold labels, the depressed portions have an average depth in a range of 0.02 to 0.1 mm, an average number in a range of 25 to 2,500 per square cm of the unit surface area of the label, and a total of spatial volumes in a range of 0.001 to 0.005 cubic cm per square cm of the unit surface area of the label. Within these ranges set for the depressed portions, the entrapment of air and the development of wrinkles can be effectively controlled in the 3D curved areas of the peripheral wall of the container main-body. Thus, it has become possible to offer a labeled container to which the labels have been adhered in a high-grade state.

In the above feature and in the descriptions below, the term of back side or surface side is used to describe the laminar structure of the labels. It is meant here that the back side of a label denotes a side which comes in contact with the peripheral wall of the container main-body, and that the corresponding surface side denotes the other side, i.e., the side exposed to the outside when the label has been adhered to the container main-body.

If the average depth of the depressed portions is less than 0.02 mm, or if a total of the spatial volumes is less than 0.001 cubic cm per square cm of the unit surface area, or if the number of the depressed portions is more than 2,500 per square cm of the unit surface area, then after the labels have been adhered, air entrapment and/or wrinkle development tend to occur especially in the 3D curved areas.

On the other hand, if the average depth is more than 0.1 mm, or if the total of spatial volumes is beyond 0.005 cubic cm, or if the number of the depressed portions is less than 25 per square cm of the surface area, then printing would become smudgy, and the outer appearance would become low-graded. Furthermore, as another problem, the labels would have a low adsorption quality when the labels are inserted into the mold.

In order for the labels in the planar shape to be adhered smoothly over the 3D curved areas of the container in the in-mold labelling, while controlling the air entrapment and the wrinkle development, the labels are required to have a property capable of tracing the curves and deforming exactly in line with the changes in the 3D curved surfaces. Such a tracing property would be imparted only when the depressed portions have a certain necessary depth, an appropriate size and number, and a regularly arranged pattern. Therefore, according to the above-described feature, the depressed portions of each in-mold label are embossed in a regularly arranged pattern, and the depth, the number, and the total of the spatial volumes of the depressed portions are set in respective predetermined ranges. In this way, the labels would have a tracing property that enables the labels to deform exactly in line with the 3D curved surfaces. In addition, since the depressed portions fully performs a role as an air escape, the entrapment of air and the development of wrinkles can be effectively controlled.

Another feature of the labels of this invention is that, in the main feature described above, the value of G is calculated by an equation (I) given below:

$$G = E * t^3 \quad (I)$$

where E is tensile elastic modulus of the label, in MPa; and t is a thickness of the label, in mm; and this value of G is set within a range of 0.05 to 0.20.

The second feature described above is a requirement for imparting the tracing property fully to the labels which have to deform exactly in line with the 3D curved surfaces of the container to be labeled, and the tracing property is imparted from an index correlated with label stiffness, that is, the flexural stiffness of labels. According to the second feature, the value of G is calculated from the equation (1) as the index correlated with the flexural stiffness of the labels. A value of G in a range of 0.05 to 0.20, and more specifically at 0.20 or less would give full elasticity to the labels. In that case, the labels would have a full tracing property that allows deformation to spread exactly in line with the changes in the 3D curved surfaces of the container. When an appropriate value of G is combined with the main feature of the depressed portions that are embossed in a regularly arranged pattern, the labels would be able to achieve high-grade adhesion with no wrinkles, etc.

With a stiffness value more than 0.20, the planar labels would have an insufficient tracing property in order for the deformation to spread exactly in line with the shape of 3D curved areas of the container, and may cause the wrinkles to develop on the adhered surfaces.

Another problem at this stiffness value is that, if a labeled container happens to fall by mistake, cracks tend to occur due to the impact of fall, with marginal edge portions serving as the starting point.

On the other hand, with a stiffness value less than 0.05, there would be a decrease in the performance of automatic label supplies when the labels are set mechanically onto the mold surface. Another problem at this stiffness level is that labels would develop wrinkles due to the flow of molten resin that takes place after the labels have been set.

Still another feature of the labels of this invention is that, in the main feature described above, the rate of a total area of the depressed portions occupying in an entire surface area of the label is set in a range of 10 to 70%.

If the rate of area of the depressed portions is less than 10%, then after the labels have been adhered, the 3D curved surfaces tend to have air entrapped and to develop wrinkles. If the rate of area exceeds 70%, then adhesiveness would become low because of a smaller area used for adhesion to the container main-body. Therefore, it is preferred that the rate of a total area of the depressed portions occupying in the entire surface area of the label should be in the range of 10 to 70%.

Still another feature of the labels of this invention is that, in the main feature described above, each label has a concavo-convex structure, with all the laminated layers being embossed in a back-to-surface direction, since the depressed portions are formed by embossing.

According to the above-described feature, since all the laminated layers are embossed in the back-to-surface direction to give the concavo-convex structure to the labels, the depressed portions would be able to have a sufficient depth without being limited to the thickness of an adhesive layer, although this depth must be within the limit shown by the main feature. This sufficient depth in turn can give the labels an effective tracing property.

Still another feature of the labels of this invention relates to an embodiment of a specific laminar structure of the labels having the above-described main feature. That is, the label comprises a transparent substrate layer of a synthetic resin film, a printed layer on the back side of the substrate layer, and an adhesive layer of a synthetic resin put on the anchor coat layer (hereinafter referred to as the AC layer) by means of an extrusion laminate processing method, and the adhesive layer can be directly heat-sealed to the peripheral wall of the container main-body. The depressed portions are formed by embossing on the back side of the adhesive layer in a state that the adhesive layer has been cooled and solidified after the substrate layer, the printed layer, and the adhesive layer were laminated.

Still another feature of the labels of this invention relates to another embodiment of a specific laminar structure of the labels having the above-described main feature. This label comprises an adhesive layer of a synthetic resin film that can be directly heat-sealed to the peripheral wall of the container main-body, a printed layer laminated on the surface side of the adhesive layer, and a protective layer of a synthetic resin put on the AC layer by means of the extrusion laminate processing method and through an intermediary of an AC layer laminated on the printed layer and the adhesive layer. The depressed portions are formed by embossing on the back side of the adhesive layer in a state in which the protective layer has been cooled and solidified after the adhesive layer, the printed layer, and the protective layer were laminated.

A main feature of the labeled container of this invention is a synthetic resin container to which labels have been adhered by an in-mold labelling process, wherein the peripheral wall of the container main-body has 3D curved surface areas, and wherein the above-described in-mold labels of this invention have been adhered to the areas, including the 3D curved surface areas, of the peripheral wall of the container main-body, in tight contact with, and exactly in line with the shape of, the peripheral wall over entire adhesion areas.

By using the above-described in-mold labels of this invention, it has become possible for the labels to be adhered in a high-grade state with no air entrapment and/or no wrinkle development in the 3D curved surface areas. Thus, it has also become possible to provide the labeled container having the above-described feature wherein the labels are adhered in tight contact with, and exactly in line with the shape of, the peripheral wall over the entire adhesion areas in a high-grade state without air entrapment, wrinkle development, and/or peeling.

Another feature of the labeled container of this invention is that, after the molding and labeling process has been complete, the labels have a depth in a range of 0.01 to 0.08 mm.

According to the above-described feature, the depressed portions of the labels can be made sufficiently deep. As a result, there remains the space formed between the depressed portions of the adhesive layer and the container wall. At the time of in-mold labeling, the depressed portions would not be largely broken by the pressure or heat of the parison, but can allow air to escape effectively from between the parison wall and the label. In addition, the development of air entrapment can be fully controlled by enlarging absorbability of the space formed by the depressed portions, because the depressed portions can accept and absorb the entrapped air.

Effects of the Invention

This invention having the above-described features has the following effects:

The in-mold labels of this invention make high-grade adhesion available in a high-grade state with no entrapment of air and no development of wrinkles over the 3D curved surfaces. The tracing property capable of deforming exactly in line with the 3D curved surfaces can be imparted to the labels by embossing and laying out the depressed portions in a regular pattern on the back side of the adhesive layer to be adhered to the peripheral wall of the container main-body, and also by setting the depth, the number, and the total volume of these depressed portions at levels that should fall within appropriate ranges. Since the depressed portions have a function as an air escape and a function of absorbing air that have failed to escape, these functions are also helpful in the effective control of air entrapment and wrinkle development in the 3D curved surface areas.

BRIEF DESCRIPTION OF THE DRAWINGS

FIGS. 13 (a), (b) and (c) are vertical sections showing examples of laminar structures used in conventional in-mold labels.

PREFERRED EMBODIMENTS OF THE INVENTION

Figure 1:
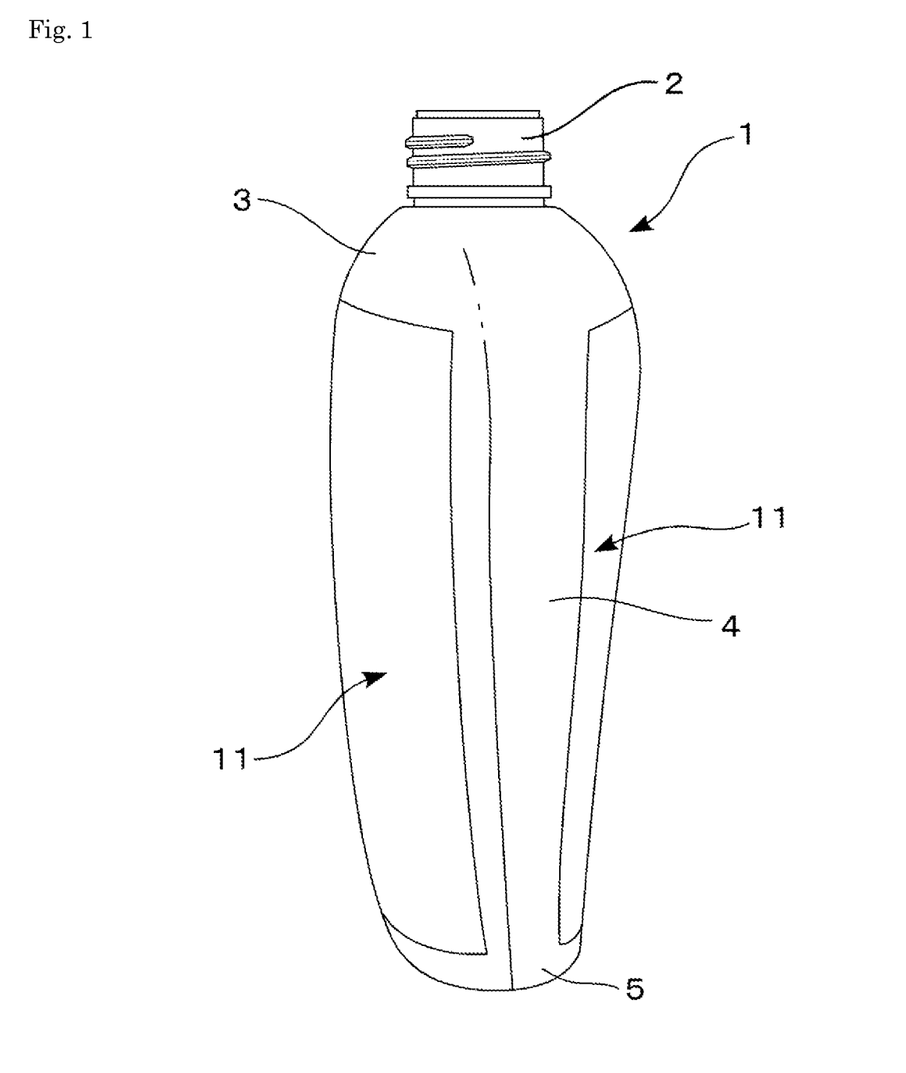
FIG. 1 is a perspective view of the labeled container in one embodiment of this invention.
Figure 2:
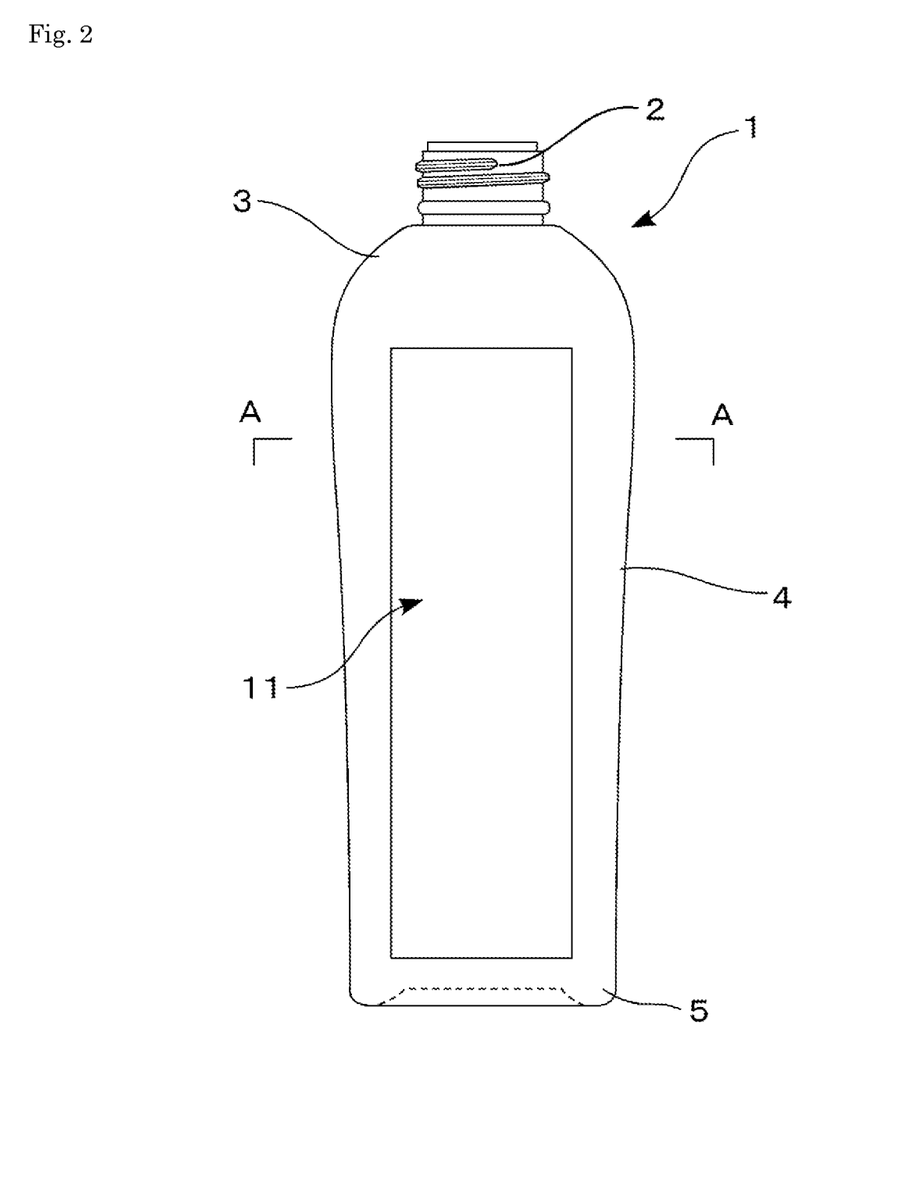
FIG. 2 is a front view of the container of FIG. 1.
Figure 3:
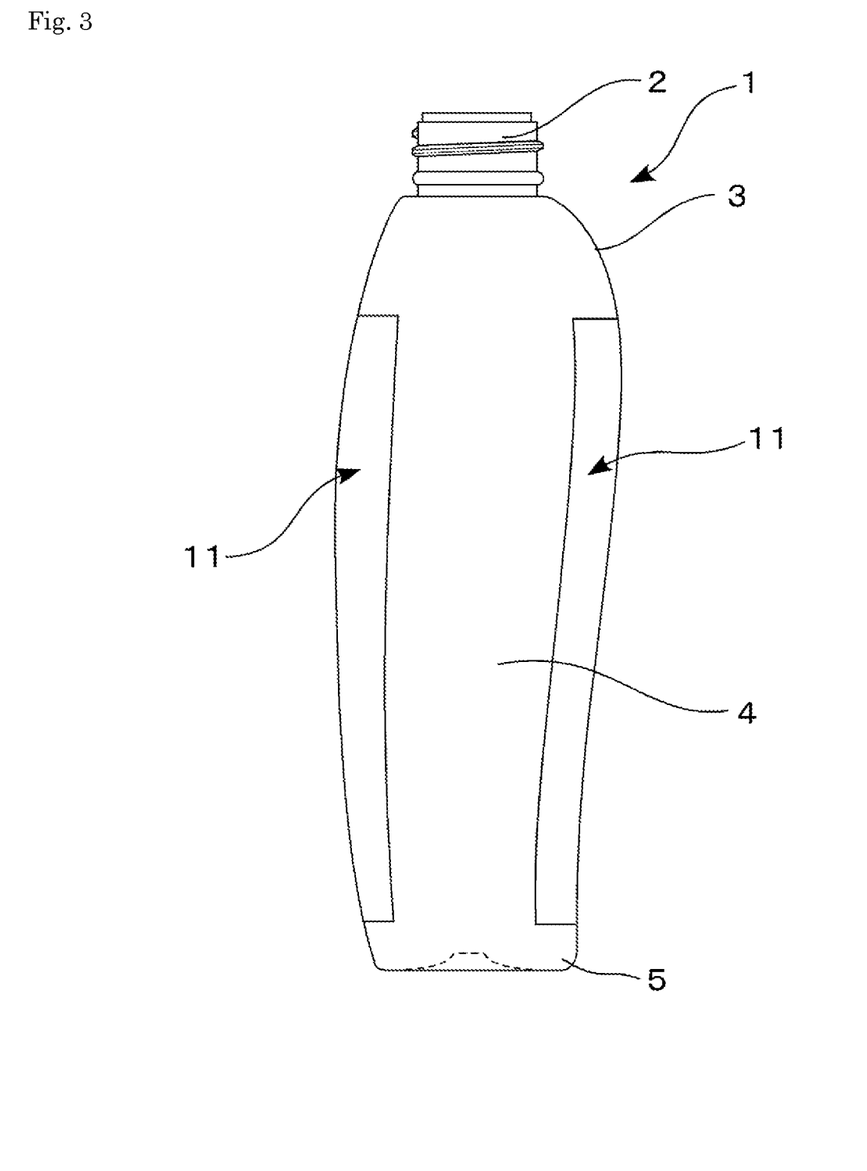
FIG. 3 is a side view of the container of FIG. 1.
Figure 4:
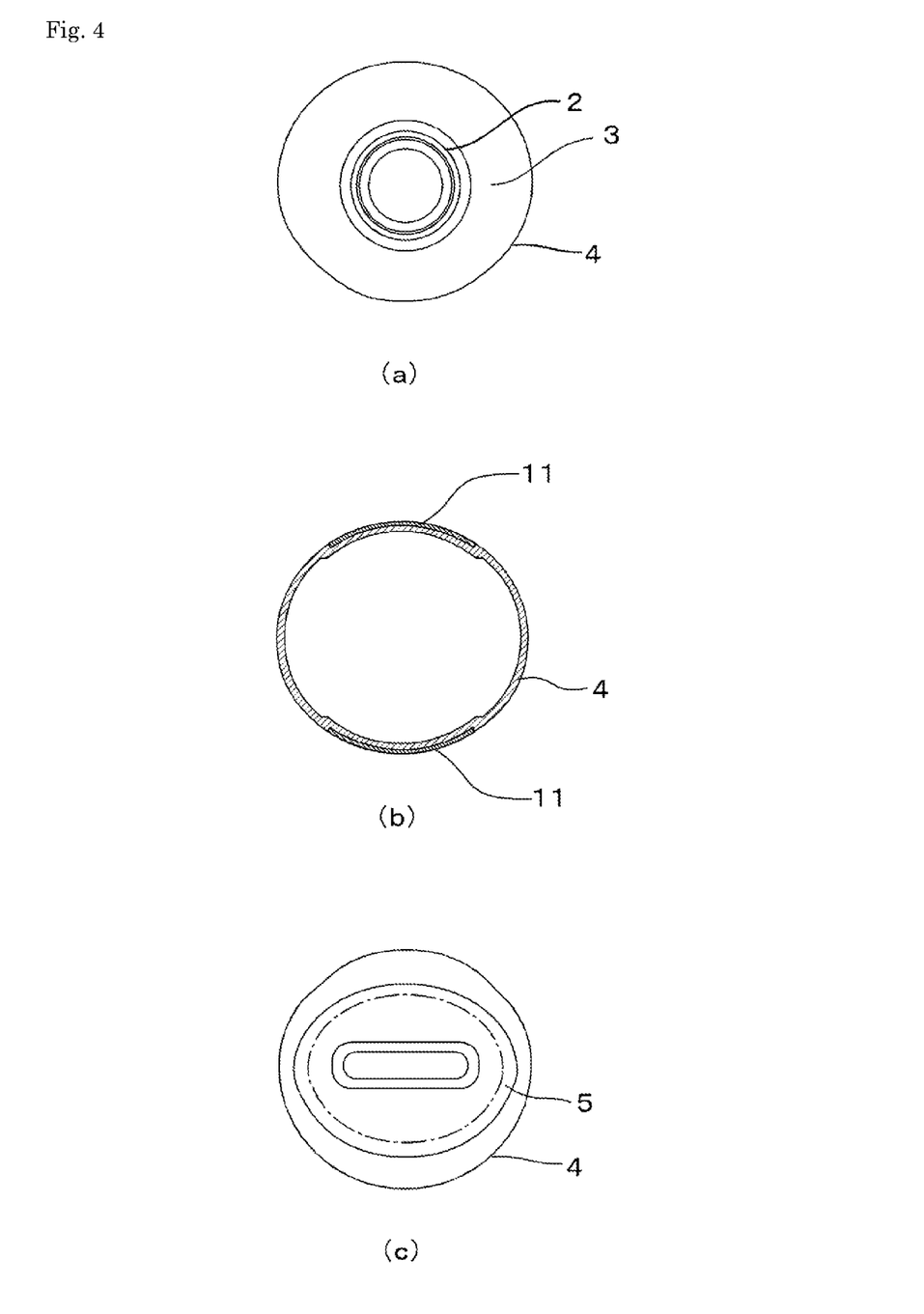
FIG. 4(a) is a plan view.
FIG. 4(b) is a cross-sectional view taken along line A-A in FIG. 2.
FIG. 4(c) is a bottom view of the container of FIG. 1.

This invention is further described below with respect to preferred embodiments, now referring to the drawings, in which FIGS. 1-4 show the labeled container in the first embodiment of this invention. FIG. 1 is a perspective view of the labeled container viewed from a point facing a side of the container. FIG. 2 is a front view; FIG. 3, a side view; FIG. 4(a), a plan view; FIG. 4(b), a cross-sectional view taken from line A-A in FIG. 2; and FIG. 4(c), a bottom view.

Figure 5:
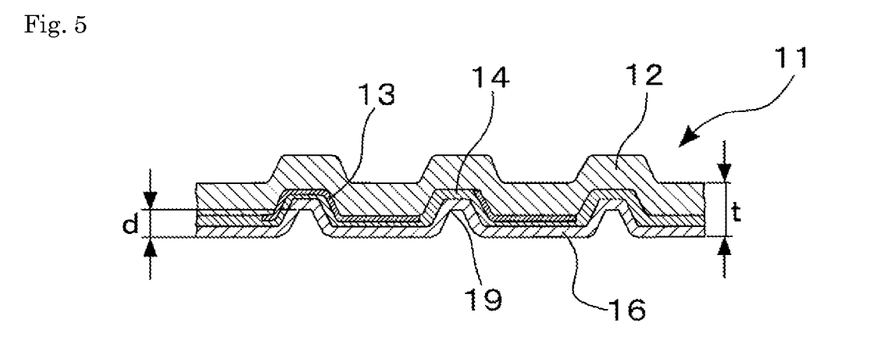
FIG. 5 is a vertical section showing a laminar structure of an in-mold label in the first embodiment (example 1) of this invention.
Figure 6:
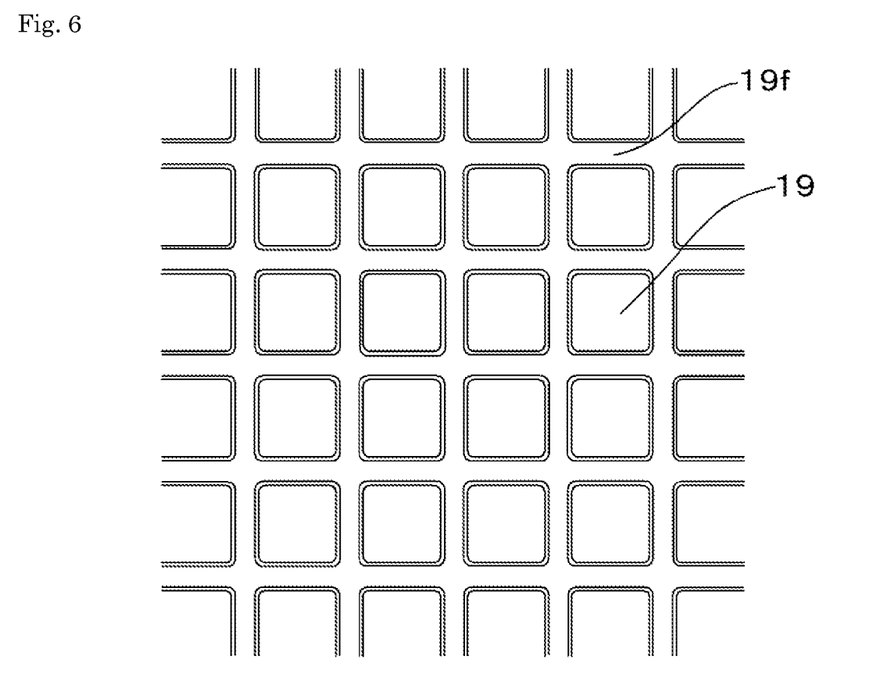
FIG. 6 is a plan view showing a layout pattern of depressed portions as seen from the back side of the in-mold label of FIG. 5.

FIG. 5 is a vertical section showing a laminar structure of the in-mold label in the first embodiment of this invention to be used in this labeled container. FIG. 6 is a plan view showing a layout pattern for the depressed portions 19 as seen from the back side of the in-mold label of FIG. 5.

The labeled container of FIG. 1 is a product obtained by adhering the labels 11 shown in FIGS. 5 and 6 to both the front and back sides of the container main-body 1.

The container main-body 1 is a direct blow molded product made of high-density polyethylene (HDPE) and is a bottle comprising a cylindrical neck 2, a shoulder 3, an elliptical body 4, and a bottom 5 and having an entire height of 155 mm and a capacity of 230 ml, with the body 4 having an average thickness of 0.80 mm.

The body 4 of the container main-body 1 has a shape of a generally elliptical cylinder, but the body 4 narrows gradually from an upper end to a lower end. The peripheral wall is curved in the circumferential direction as well as in the vertical direction. Thus, the outer peripheral surface of the body 4 forms 3D curved surface areas over almost entire surface.

And the labels 11 are adhered tightly to the body 4 of this container main-body 1 over wide areas, including the 3D curved surface area on the front side, and ranging from the upper end to the lower end, in a high-grade state with no air entrapment and wrinkle development over the entire adhesion surfaces.

As shown in FIG. 5, the label 11 has a laminar structure comprising, from the front side (from upper side in FIG. 5), a substrate layer 12, a printed layer 13, an AC layer 14, and an adhesive layer 16, wherein the substrate layer 12 is made of a transparent CPP film with a thickness of 0.070 mm, and the adhesive layer 16 is a low-density polyethylene (LDPE) layer laminated by the extrusion laminate processing method. As will be described, the adhesive layer 16 has a thickness of 0.010 mm before it is embossed, and the entire label 11 has an average thickness of 0.085 mm.

The following is an outline of the process for manufacturing the above-described labels 11 shown in FIG. 5:

(1) The printed layer 13 is formed by printing on the back side of the transparent CPP film;

(2) An AC layer 14 is laminated onto the back side of the printed layer 13 by applying an anchor coating agent to the back side and drying the agent;

(3) A LDPE resin is laminated to the AC layer 14 by the extrusion laminate processing method to give an adhesive layer 16;

(4) After the adhesive layer 16 has been cooled and solidified by means of chill rolls, the back side of the adhesive layer 16 is embossed by an emboss roll having an emboss pattern; and (5) After slitting, the labels are punched into a predetermined shape.

In the case of the label of the first embodiment shown in FIG. 5, the label 11 has a total thickness of 0.085; the adhesive layer has a layer thickness of 0.010 mm; and the depressed portions 19 have an average depth, d, of 0.060 mm. The effect of embossing is not limited to the adhesive layer 16 only, but the entire thickness of the label 11 is affected. Thus, the entire label 11 has a concavo-convex structure in which all the layers are embossed in the back-to-surface direction.

The AC layer 14 is used to strengthen the adhesion between the printed layer 13 and the adhesive layer 16.

The adhesive layer 16 is a layer of an LDPE resin laminated by the extrusion laminate processing method, and at the time of in-mold labeling, is heat-sealed directly to the peripheral wall of the container main-body 1 made of an HDPE resin.

The printed layer 13 can be formed by various printing methods, such as gravure printing, screen printing, flexography printing, etc.

The anchor coating agents to be used include polyethylene imine, polyether polyol polyisocyanate, polyester polyol polyisocyanate, and the like, which are diluted before use with water or an organic solvent.

FIG. 6 shows a layout pattern for the depressed portions 19 which have been formed by embossing on the back side of the adhesive layer 16. Each of the depressed portions 19 has a square shape in its plan view, and is surrounded by flat portions 19f in a lattice pattern. Thus, the label 11 has a regular pattern over the entire surface. The depressed portions 19 have the following values as the indexes of layout:

The depressed portions 19 has an average depth, d, of 0.060 mm.

The rate of a total area of the depressed portions 19 occupying per square cm of a unit surface area of the label 11 (hereinafter referred to as the area ratio, Atr) is 46%.

The number of the depressed portions 19 per square cm of the unit surface area of the label 11 (hereinafter referred to as the Nt) is $324/cm^2$.

The rate of a total volume, in cubic cm, occupying per square cm of the unit surface area of the label 11 (hereinafter referred to as the rate of total volume, Vt) is $0.002 \ cm^3/cm^2$.

After the labels have been adhered to the peripheral wall of the container main-body 1, the depth, d, of the depressed portions 19 was observed by enlarging the depressed portions under a microscope. As a result, the average depth, d, was found to be 0.030 mm.

Tensile elastic modulus, E, was measured for the labels 11 of the first embodiment (example 1) shown above in FIG. 5. Then, as an index of stiffness of the labels 11, the value of G was calculated by an equation (I) given below:

$$G=E*t^3 \qquad (I)$$

where E is tensile elastic modulus, in MPa, and t is label thickness, in mm. This value of G was 0.142 in the longitudinal direction, and 0.130 in the lateral direction, both of which was less than 0.20. From the index associated with stiffness, the labels are found to have a sufficient tracing property that enables deformation to spread exactly in line with the 3D curved surface areas of the container. It is noted here that the label thickness, t, is a thickness of the portion where any depressed portion 19 is not formed by embossing. The tensile elastic modulus was obtained by punching the labels in a dumbbell shape according to ASTM-1822L, and conducting tensile tests at a tension rate of 1 mm/min. Here, the longitudinal direction of labels corresponds to a shaft direction of the container main-body at the time when the labels have been adhered to the main body. The lateral direction corresponds to a direction perpendicular to the longitudinal direction.

Figure 10:
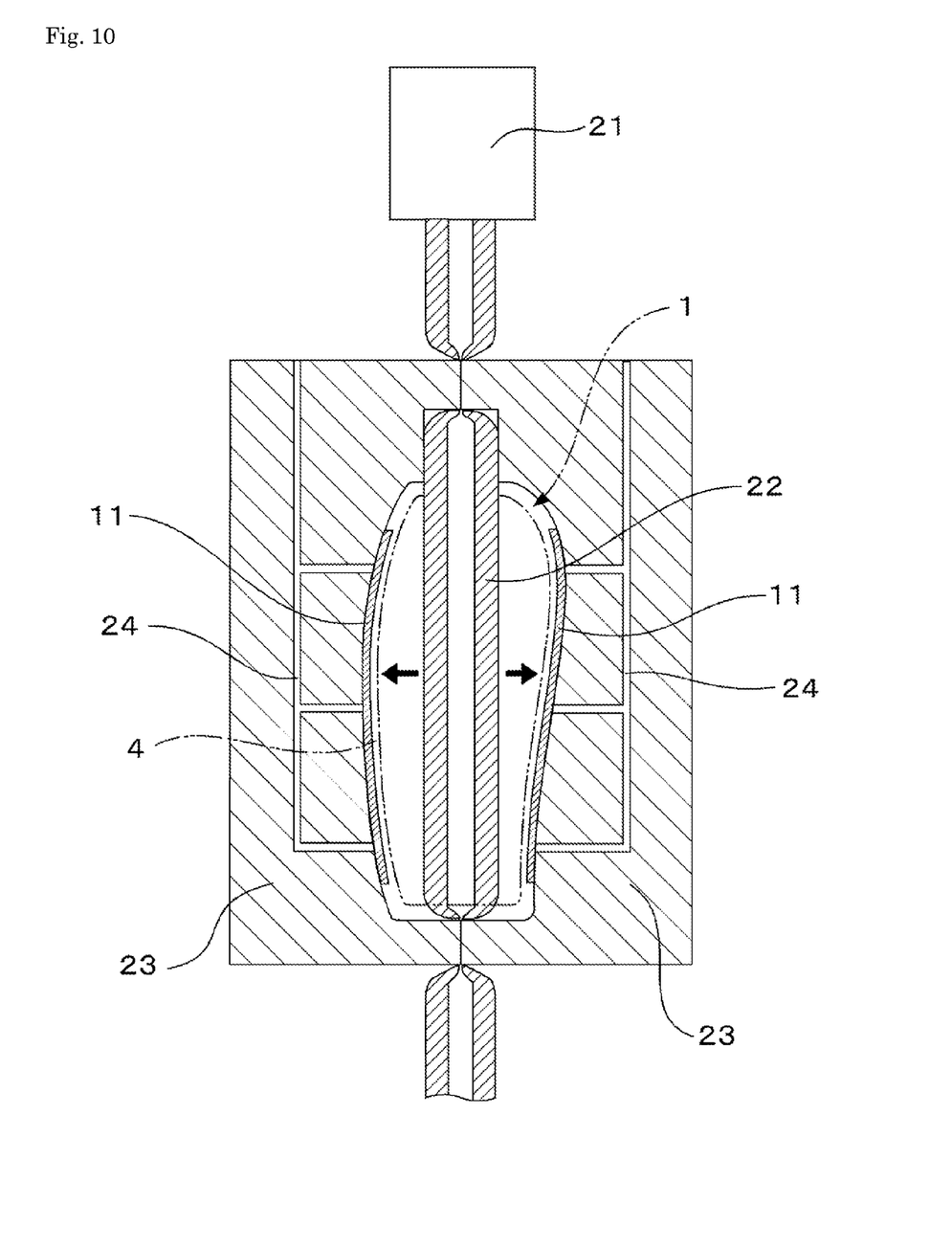
FIG. 10 is a schematic diagram of the process for molding the labeled container of this invention.

Next, FIG. 10 is a schematic diagram showing the in-mold labeling process steps for molding the labeled container of the first embodiment described above. In the figure, cylindrical parison 22 made of an HDPE resin was extruded from a die 21, and is now in a state in which the parison has been pinched off at its upper and lower ends by a split blow mold 23.

The labels 11 have been previously adsorbed onto the mold by evacuating air through passages 24 for evacuation of decompressed air, although the labels 11 do not necessarily come in contact with the mold surfaces, but partly stay afloat in those portions corresponding to the 3D curved surface areas. In this state, when air is blown into the parison 22, it expands (see the arrowed directions in FIG. 10) and takes shape in line with cavity outlines (see the shape depicted by two-dot chain lines in FIG. 10), and the labels 11 adhere integrally to the peripheral wall of the body 4.

The adhesive layer 16 of each label 11 is heat-sealed to the peripheral wall surface of the body 4 of the container main-body 1 by the in-mold labeling process. At that time, especially if the labels 11 are adhered to the outer peripheral surface having 3D curved surface areas, such as shown in FIG. 1, then air entrapment, wrinkling, and/or peeling tend to develop more often than in the case where the labels 11 are adhered to 2D curved surface areas, because planar labels 11 adhere progressively while deforming exactly in line with the shape of these 3D curved surface areas. However, as described above, if the depth d, the area rate, Atr, the number, Nt, and the total volume, Vt, of the depressed portions 19 are set within predetermined ranges, then the labels 11 would bring about an accordion effect which results from the concavo-convex structure formed through the entire thickness in the back-to-surface direction, and would be able to ease the constriction behavior of the labels 11 in contact with high-temperature parison. The accordion effect and the ease of constriction combined would give the labels 11 a tracing property which enables the labels to deform exactly in line with the 3D curved surfaces. In addition, since the depressed portions 19 fully performs the function as the air escape routes at the time of in-mold labeling, the air entrapment, wrinkling, and peeling can be prevented effectively from developing.

Figure 7:
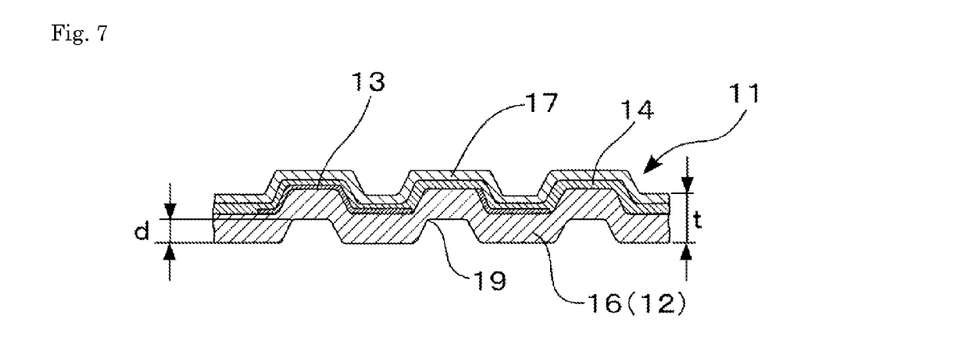
FIG. 7 is a vertical section showing a laminar structure of the in-mold label in the second embodiment (example 2) of this invention.

FIG. 7 is a vertical section showing a laminar structure of the in-mold labels in the second embodiment (example 2) of this invention. The label has the laminar structure comprising, from surface to back (from top to bottom in the figure), a protective layer 17, an AC layer 14, a printed layer 13, and an adhesive layer 16. This adhesive layer 16 is made of a CPP film having a thickness of 0.070 mm. The protective layer 17 is formed by laminating to the label a layer of an LDPE resin by means of the extrusion laminate processing method, and has a layer thickness of 0.010 mm. On the whole, the label 11 has an average thickness of 0.085 mm, and has a laminar structure, such as the one just obtained by turning upside down the layers of the label 11 of the first embodiment (example 1) shown in FIG. 5. The adhesive layer 16 in the above laminar structure also performs the function of a substrate layer 12.

The above-described label 11 shown in FIG. 7 is manufactured roughly by the process steps described below:

(1) The adhesive layer 16 is formed by a CPP film that is directly heat-sealed to the wall of the container main body 1, and the printed layer 13 is put on the surface side of this adhesive layer 16;

(2) Then, an anchor coating agent is applied thereon and dried to form the AC layer 14;

(3) Next, a layer of an LDPE resin is laminated to the surface of the AC layer 14 to form the protective layer 17 so that the printed layer 13 is protected against damages:

(4) After the protective layer 17 has been cooled and solidified by means of chill rolls, the back side of the adhesive layer 16 is embossed by an emboss roll having an emboss pattern; and (5) After slitting, the labels are punched into a predetermined shape.

Also in the label 11 of the second embodiment (example 2) shown in FIG. 7, the effect of embossing is not limited to the adhesive layer 16 only, but the entire thickness of the label 11 is affected. Thus, the whole label 11 has a concavo-convex structure in which all the layers are embossed in the back-to-surface direction.

Figure 11:
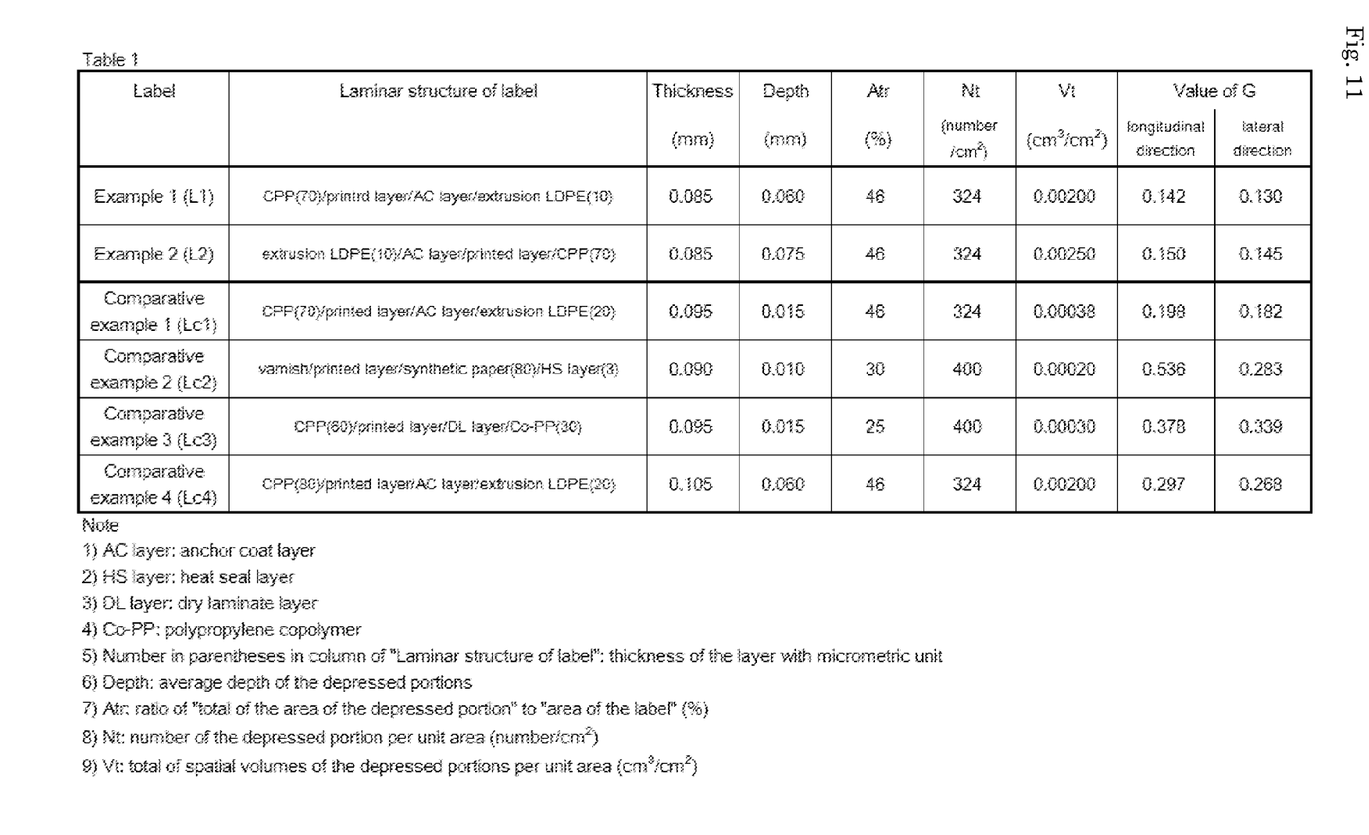
FIG. 11 is a table in which to compile various laminar structures in the embodiments of this invention and in the comparative examples.
Figure 12:
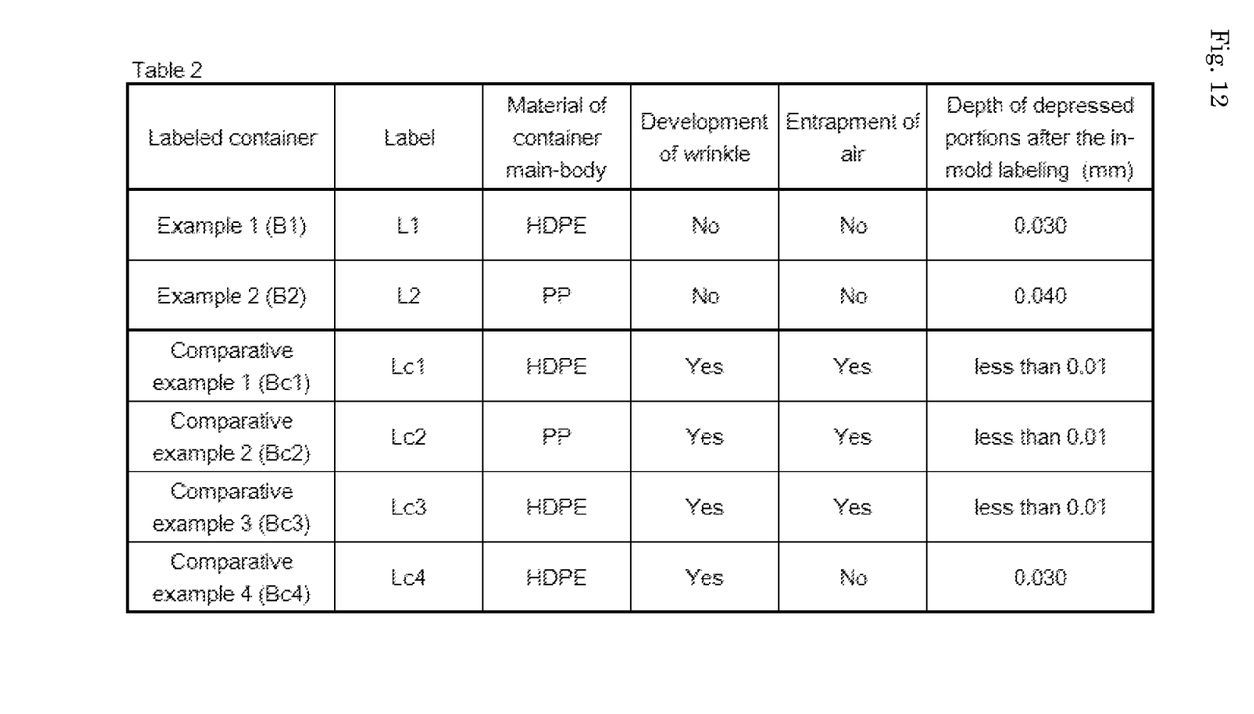
FIG. 12 is another table in which to compile the evaluation results, such as the conditions of adhesion, and the like, for various labeled containers obtained from both the embodiments of this invention and the comparative examples by using the in-mold labels shown in FIG. 11.

FIG. 11, i.e., Table 1, shows laminar structures of the labels 11 of the first embodiment (example 1) shown in FIG. 5 (named L1), the labels 11 of the second embodiment (example 2) shown in FIG. 7 (named L2), and labels named Lc1, Lc2, Lc3 and Lc4 from comparative examples 1, 2, 3 and 4, which were prepared for the purpose of comparisons. The table 1 was also compiled for the depth, d, the area rate, Atr, the number, Nt, the total volume, Vt and the values of G, as indexes for the patterns of the depressed portions 19 that have been embossed in the back surface of the adhesive layer 16. FIG. 12, i.e., Table 2, shows the results of observations on wrinkling and air entrapment and the results of measurements for the depth of depressed portions 19 after the in-mold labeling, using 6 types of labels (named L1, L2, Lc1, Lc2, Lc3 and Lc4) shown in Table 1 and 6 types of corresponding labeled containers made of either the HDPE resin or the PP resin and molded by the in-mold labeling process of FIG. 10 in the mold used to mold the labeled container shown in FIG. 1. In the example 1 (container B1), use was made of the labels having the structure shown in FIG. 5. In the example 2 (container B2), use was made of the labels having the structure shown in FIG. 7. In the comparative examples 1, 2, 3 and 4 (containers Bc1, Bc2, Bc3 and Bc4), use was made of the labels Lc1, Lc2, Lc3 and Lc4 shown in FIG. 11.

Figure 8:
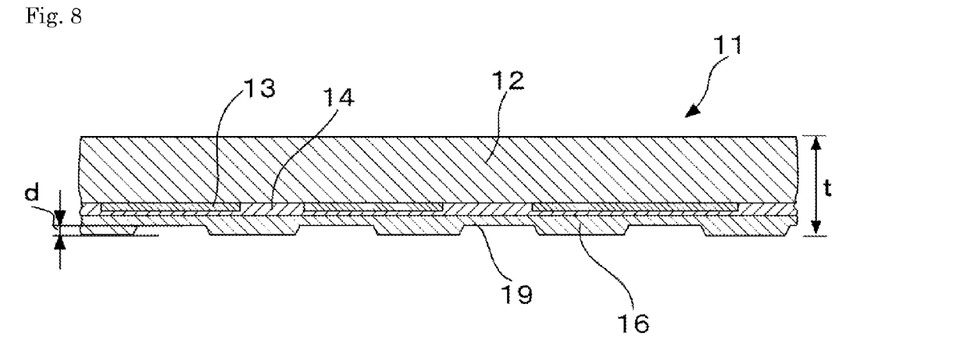
FIG. 8 is a vertical section showing a laminar structure of the in-mold label in the comparative example 1.

FIG. 8 is a vertical section showing the laminar structure of the label 11-Lc1. This label 11-Lc1 has a laminar structure similar to that of the label 11-L1, as shown in Table 1 of FIG. 11. The depressed portions 19 of Lc1 have the layout pattern similar to the pattern shown in FIG. 6. This layout pattern is obtained by first laminating an LDPE resin to the AC layer by the extrusion laminate processing method to form the adhesive layer 16, and then embossing the adhesive layer 16, even as the adhesive layer 16 has been cooled and solidified by means of a chill roll having the emboss pattern. The adhesive layer 16 has a thickness of 0.020 mm, and the depressed portions 19 are formed by embossing only this layer. As for the indexes that characterize the layout pattern, the depressed portions 19 have a depth, d, of about 0.015 mm. The area rate Atr and the number Nt are similar to those of L1 and L2, but the total volume, Vt, remains at a low level.

Figure 9:
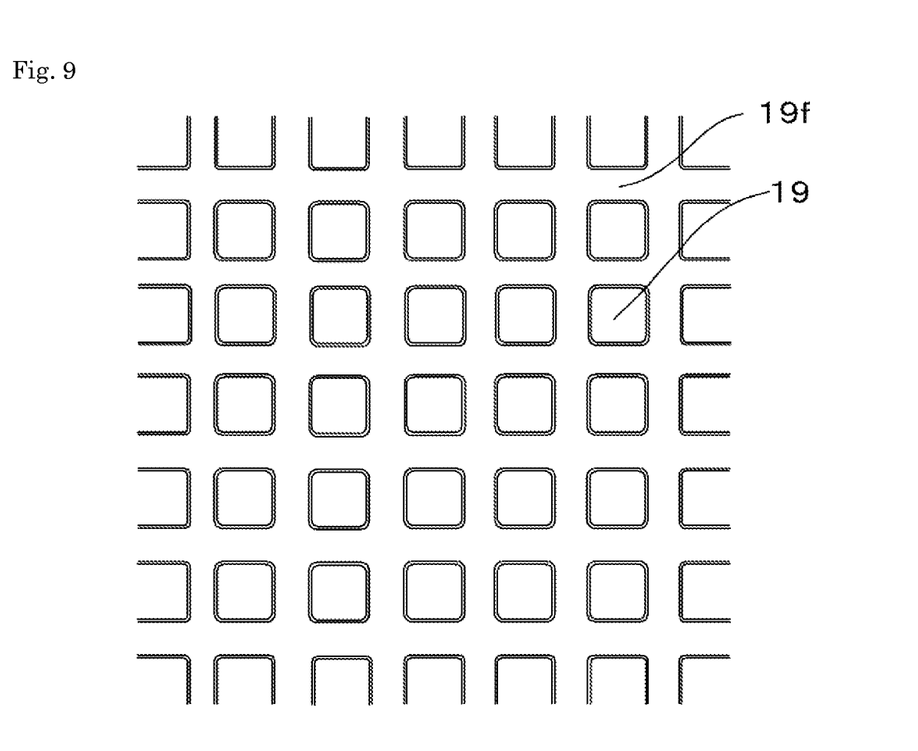
FIG. 9 is a plan view showing a layout pattern of depressed portions as seen from the back side of the in-mold label in the comparative example 2.

The label 11-Lc2 has a laminar structure comprising a varnish layer, a printed layer, a substrate layer made of synthetic paper, and a heat-sealed (HS) layer on the back of the substrate layer. This HS layer is then embossed with an emboss roll and is used as the adhesive layer. FIG. 9 shows a layout pattern for the depressed portions 19 of Lc2. As compared to the pattern for L1 and L2 shown in FIG. 6, the label Lc2 has an Nt of more depressed portions and a less surface area of each square depressed portion 19 than the pattern for labels L1 and L2. The label 11-Lc3 has a laminar structure in which a substrate layer of a CPP film are laminated with an adhesive layer by a dry laminate process and through an intermediary of a dry laminate (DL) layer, wherein the adhesive layer is made of a copolymerized PP resin film (Co-PP film) and has been embossed previously on the back side. The depressed portions 19 have roughly the same layout pattern as shown in FIG. 9. In the cases of the labels LC2 and Lc3, too, the depressed portions 19 are formed by embossing only the adhesive layer, with the depth being roughly in a range of 0.010 to 0.015. In the label 11-Lc4, the laminar structure and the indexes of layout pattern, including the depth, d, the area rate, Atr, the number of the depressed portions, Nt, and the total volume, Vt, are similar to those of label L1. The substrate layer 12 and the adhesive layer 16 have larger thicknesses than in the label L1, and the entire label 11-Lc4 has an average thickness of 0.105.

FIG. 12, i.e., Table 2, shows that neither wrinkling nor air entrapment was found in the labeled containers of Examples B1 and B2. There were wrinkling and air entrapment in the containers Bc1, Bc2, and Bc3 of comparative examples 1, 2, and 3. There was no air entrapment in the container Bc4, but the development of wrinkles was observed. As for the results of measurements for the depth, d, of the depressed portions 19 after the containers have been molded, the labeled containers of B1 and B2 had a depth of 0.030 mm and 0.040 mm, respectively. The containers Bc1, Bc2, and Bc3 of comparative examples had a depth less than 0.010 mm, which was below the limit of measurement. Most of the depressed portions 19 of these containers had disappeared during the in-mold labeling process steps. It is considered that in the cases of the labels of comparative examples, the depressed portions 19 have failed to have a satisfactory function serving as air escape passages during the time of in-mold labeling and/or a sufficient tracing property that enables deformation to spread exactly in line with the 3D curved surface areas, and have run short of the function of controlling the development of wrinkles and air entrapment.

If labels are adhered to the peripheral wall having 3D curved surface areas, as in the case of the labeled container shown in FIG. 1, it is not always sufficient to lay out the depressed portions 19 that have been embossed in a regular pattern, as in the case of Lc1. The depressed portions to be laid out in a regular pattern must have a depth in a predetermined range. In addition, the depressed portions 19 are required to have a number, Nt, per unit area and a total volume, Vt, that are set in predetermined ranges.

It is found from the results of observations on the labeled containers B1 and Bc4 shown in FIG. 12, i.e., Table 2, that, if the labels 11-Lc4 have a laminar structure and a layout pattern for the depressed portions 19 that are similar to those of the labels 11-L1, and if the labels have an excessive average thickness, with a large value of G in excess of 0.20, then the stiffness of labels is too large, and the tracing property is insufficient for the deformation to spread exactly in line with the shape of 3D curved surface areas of the container. Although there was no development of air entrapment, it is found that wrinkles tend to develop on the adhered surfaces of the label 11-Lc4. Therefore, at the time when the labels are put to practical use, it is preferred to determine previously a laminar structure and a layout pattern that are considered best for the depressed portions 19, and then to set an appropriate level of stiffness for the labels, using the value of G as the index.

This invention has been described for its features and action-and-effects by taking up the preferred embodiments. However, the labels and the labeled containers of this invention should not be construed as limitative to these embodiments. For instance, in the above embodiments, the container main-body was manufactured by a direct blow molding process, but it can also be manufactured by biaxial stretching and blow molding, or by thermoforming. The laminar structures of the labels are not limited to those shown in the first and second embodiments, but can be arbitrarily selected from a variety of laminar structures, while giving consideration to the combinations of structures with the synthetic resins to be used for the container main-body. As for the regular layout patterns for the depressed portions, an appropriate pattern can be selected from various patterns in addition to those shown in FIGS. 6 and 9.

INDUSTRIAL APPLICABILITY

As described above, the in-mold labels of this invention can be adhered to the 3D curved surface areas of the peripheral wall of the container main-body in a high-grade state with no air entrapment and/or wrinkling. Therefore, wide applications of use can be expected for the labeled containers having these labels adhered thereto, as the containers that have been decorated in a manner not experienced before.

DESCRIPTIONS OF REFERENCE SIGNS

1; Container main-body
2; Neck
3; Shoulder
4; Body
5; Bottom
11; Label
12; Substrate layer
13; Printed layer
14; Anchor coat layer
16; Adhesive layer
17; Protective layer
19; Depressed portion
19f; Flat portion
21; Die
22; Parison
23; Blow split mold
24; Passage for evacuation of decompressed air
d; Depth of the depressed portion
t; Thickness of label

The invention claimed is:

1. In-mold labels used as an inserted material and adhered to an outer peripheral wall of a container main-body concurrently when the main body is being molded, the labels comprising:
   an adhesive layer having a front surface and a back surface, wherein the back surface of the adhesive layer is to be adhered directly to the outer peripheral wall; and
   at least one layer on the front surface of the adhesive layer,
      wherein the adhesive layer has depressed portions that are formed by embossing and are disposed in a regular pattern on a back surface of the adhesive layer,
      wherein each of the depressed portions has a square shape in plan view and are surrounded by flat portions in a lattice pattern, because of the depressed portions, convex portions are formed at positions on the front surface corresponding to each depressed portion, so that the adhesive layer and the at least one layer have a concavo-convex structure, and
   wherein the depressed portions have:
      an average depth in a range of 0.02 to 0.1 mm,
      an average number in a range of 25 to 2,500 per square cm of a unit surface area of a label, and
      a total of spatial volumes in a range of 0.001 to 0.005 cubic cm per square cm of the unit surface area of the label.

2. The in-mold labels according to claim 1, wherein the value of G is calculated by an equation (I) given below:

$$G = E^* t^3 \qquad (I)$$

where E is tensile elastic modulus of the label, in MPa; and t is a thickness of the label, in mm; and wherein this value of G is set within a range of 0.05 to 0.20.

3. The in-mold labels according to claim 1, wherein the rate of a total area of the depressed portions occupying in an entire surface area of the label is set in a range of 10 to 70%.

4. The in-mold labels according to claim 1, wherein each label comprises:
   a transparent substrate layer of a synthetic resin film,
   a printed layer formed on the back side of the substrate layer,
   an anchor coat layer on the back side of the printed layer, and an adhesive layer of a synthetic resin put on the anchor coat layer by means of an extrusion laminate processing method, wherein the adhesive layer can be directly heat-sealed to the peripheral wall of the container main-body, wherein the depressed portions are formed by embossing on the back side of the adhesive layer in a state that the adhesive layer has been cooled and solidified after the substrate layer, the printed layer, and the adhesive layer were laminated, and the at least one layer is the transparent substrate layer of a synthetic resin film.

5. The in-mold labels according to claim 1, wherein each label comprises:

an adhesive layer of a synthetic resin film that can be directly heat-sealed to the peripheral wall of the container main-body, a printed layer laminated on the surface side of the adhesive layer, an anchor coat layer on the printed layer, and a protective layer of a synthetic resin put on the anchor coat layer by means of the extrusion laminate processing method, wherein the depressed portions are formed by embossing on the back side of the adhesive layer in a state in which the protective layer has been cooled and solidified after the adhesive layer, the printed layer, and the protective layer were laminated.

6. A synthetic resin container to which labels have been adhered by an in-mold labeling process, wherein the peripheral wall of the container main-body has 3D curved surface areas, and wherein the in-mold labels according to claim 1 have been adhered to areas, including the 3D curved surface areas, of the peripheral wall of the container main-body, in tight contact with, and exactly in line with the shape of, the peripheral wall over entire adhesion areas.

7. The labeled container according to claim 6, wherein, after the molding and labeling process has been complete, the labels have a depth in a range of 0.01 to 0.08 mm.

* * * * *